United States Patent [19]

DiMarco

[11] Patent Number: 4,515,830

[45] Date of Patent: May 7, 1985

[54] SOLVENT-CAST CAPACITIVE HIGH DENSITY INFORMATION DISC

[75] Inventor: Louis A. DiMarco, Mercer County, N.J.

[73] Assignee: RCA Corporation, Princeton, N.J.

[21] Appl. No.: 556,355

[22] Filed: Nov. 29, 1983

[51] Int. Cl.$^3$ .................. B05D 5/12; C04B 35/00; C09K 3/00

[52] U.S. Cl. .................... 427/122; 427/385.5; 524/495; 523/174; 523/333; 264/105; 369/286; 369/288; 106/37; 252/511; 358/342

[58] Field of Search ............... 427/100, 122, 277, 369, 427/385.5, 393.5, 425; 524/495; 523/174, 333; 428/335, 336; 264/107, 105; 369/286, 288; 106/37; 358/342; 252/511

[56] References Cited

U.S. PATENT DOCUMENTS

| | | | |
|---|---|---|---|
| 3,247,298 | 4/1966 | Utiger . | |
| 3,772,081 | 11/1973 | Franer | 428/335 |
| 3,842,194 | 10/1974 | Clemens | 178/6.6 A |
| 4,113,897 | 9/1978 | Nosker | 427/140 |
| 4,228,050 | 10/1980 | Martin et al. | 260/23 X |
| 4,233,191 | 11/1980 | Reuter et al. | 252/511 |
| 4,267,001 | 5/1981 | Dague | 156/245 |
| 4,267,212 | 5/1981 | Sakawaki | 427/425 |
| 4,315,878 | 2/1982 | Van Dover et al. | 264/107 |
| 4,390,487 | 6/1983 | O'Mara | 264/107 |
| 4,416,807 | 11/1983 | Datta et al. | 252/511 |
| 4,430,460 | 2/1984 | Martin | 523/174 |
| 4,436,683 | 3/1984 | Nishihara et al. | 264/107 |

FOREIGN PATENT DOCUMENTS

| | | | |
|---|---|---|---|
| 842153 | 3/1957 | United Kingdom . | |
| 2035843 | 6/1980 | United Kingdom | 427/122 |

OTHER PUBLICATIONS

Ricklin, "Solvent-Cast Films", Plastics Eng'ing, vol 39, No. 5, pp. 29–33, (1983).
Japanese Patent Publication No. 49-114412, with translation.
Japanese Patent Publication No. 53-119017, with translation.
German Auslegeschrift 28 12 460, with translation.

*Primary Examiner*—Joseph L. Schofer
*Assistant Examiner*—Fred M. Teskin
*Attorney, Agent, or Firm*—Birgit E. Morris; R. Hain Swope

[57] ABSTRACT

Sandwich-type capacitive electronic discs having thin conductive layers are prepared by adding a thermally processed conductive molding composition comprising a thermoplastic resin, conductive carbon black particles and suitable additives to a suitable solvent to form a dispersion of the conductive carbon black in a solution of the remaining ingredients. The dispersion is filtered to remove impurities larger than a predetermined particle size and coated onto a core disc. The coating is dried to form a conductive layer which is embossed with the desired information.

10 Claims, No Drawings

SOLVENT-CAST CAPACITIVE HIGH DENSITY INFORMATION DISC

This invention relates to sandwich-type high density information discs and a method for making them.

BACKGROUND OF THE INVENTION

Clemens, in U.S. Pat. No. 3,842,194, discloses a capacitive video disc playback system which includes a high density information record having a conductive surface. Initially, information records for this system were of a layered construction, i.e. the record consisted of a plastic disc coated with a layer of conductive metal which was in turn coated with a layer of a dielectric material, such as polystyrene. Subsequently, information discs for this system were improved by replacing the layered construction with a thermoplastic matrix having finely divided carbon particles distributed therein. However, in order to make such improved discs sufficiently conductive to obtain capacitive playback, a fairly high loading of carbon black is required. Formulations presently utilized to prepare capacitive information discs contain about 15 percent by weight of a low density carbon black in a poly(vinyl chloride)-based resin. Suitable conductive molding compositions for these discs are disclosed by Martin et al. in U.S. Pat. No. 4,228,050. Such formulations contain, in addition to the two principal ingredients, a number of additives such as compatible lubricants, stabilizers, processing aids and the like.

Molding compositions, such as described by Martin et al., are comparatively expensive due principally to the amount of high quality, low density, conductive carbon black contained therein. The number of additives present also contributes to the cost of the disc as each must be separately produced or purchased, checked for purity, stored and the like. It would be beneficial to be able to significantly reduce the amount of carbon black and additives present in each disc without losing the conductivity necessary for capacitive playback of high quality video, audio and color signal information.

A potential means of reducing the carbon black content of a capacitive electronic disc would be to produce a disc having a nonconductive central core with conductive regions or layers on the outer surfaces.

Discs having a laminated structure are known in the audio record art. For example, audio records have been produced by laminating transparent plastic outer layers onto a picture mounted onto a central core. Audio records, of course, do not require a conductive outer surface. Japanese patent publications Nos. 53-119017 and 49-114412 suggest a sandwich-type capacitive electronic disc. These publications, however, are not enabling in that they do not disclose a suitable molding composition for such discs, or any specific process parameters of how a suitable disc might be formed.

O'Mara, in U.S. Pat. No. 4,390,487, discloses a method of forming a sandwich-type capacitive electronic disc in which the conductive plastic is injected into a compression mold and a nonconductive core material injected inside the conductive material to form a layered preform which is compression molded to form a multilayered capacitive electronic disc. Discs made by this process contain up to about 70 percent by weight of nonconductive material.

Ruda, in copending U.S. patent application Ser. No. 522,332, filed Aug. 11, 1983, discloses a sandwich-type capacitive electronic disc having conductive layers which are thin in comparison to those in a disc prepared according to O'Mara. In Ruda, the conductive plastic composition is formed into sheets about 2 to 30 mils thick by passing between rollers in commercial calendering equipment or in a two-roll mill. Sandwich discs are formed by compression molding a plastic core between two such sheets. The core is comprised of a conventional audio record formulation. The conductive composition is, in essence, that described by Martin et al.

In accordance with this invention, a method has been provided to prepare unique sandwich-type capacitive electronic discs which method is advantageous over previous methodologies.

SUMMARY OF THE INVENTION

Sandwich-type capacitive electronic discs having ultrathin conductive layers, i.e. on the order of about 5 to 40 micrometers in thickness, are prepared by spraying or spin-coating a plastic core disc with a dispersion of a thermally processed conductive molding composition such as disclosed by Martin et al., drying the coating to form conductive layers and embossing the layers with the desired information by compression molding.

DETAILED DESCRIPTION OF THE INVENTION

The resin contained in the conductive layer of the subject sandwich-type capacitive electronic discs (hereinafter "CED") can be a homopolymer or copolymer of vinyl chloride, or a mixture thereof as disclosed by Martin et al., a homopolymer of styrene, or an acrylic monomer, or their copolymers as disclosed by Datta et al. in U.S. Pat. No. 4,416,807, or the like. Poly(vinyl chloride) is presently preferred for the subject discs.

Suitable conductive carbon blacks include low density blacks such as Ketjenblack EC of the Armak Company and CSX-200A of the Cabot Corporation.

The conductive layers of the sandwich CEDs of this invention contain from about 70 to 85 percent by weight of resin and from about 12 to 20 percent by weight of conductive carbon black particles.

The conductive layers of the sandwich CEDs of this invention contain up to about 10 percent by weight of additives which are selected from one or more of the following groups.

Suitable solid lubricants include stearic acid, organic stearates such as poly(vinyl stearate), metal stearates such as zinc or calcium stearate and the like, commercial mixed organic ester preparations such as Loxiol G-30 and/or Loxiol G-70, available from Henkel International GmbH, and the like. The conductive layers contain from 1 to 3 percent by weight of one or more suitable lubricants.

Suitable stabilizers are primarily organo-metallic compounds containing tin, lead, zinc, barium or cadmium. The various compounds may also contain epoxides, phosphites, alkylated phenols and the like. The organo-tin compounds are presently preferred. The conductive layers contain from about 1.5 to 4 percent by weight of the stabilizer. The amount of stabilizer present will vary depending on the resin used and the stabilizer itself. Combinations of two or more stabilizers can be utilized if desired.

Other additives may include acrylic flow modifiers, plasticizers such as diundecyl phthalate (DUP) and the like. The total amount of liquid additives, such as DUP, in the composition utilized to prepare the conductive layers is preferably not over 4 percent by weight of the composition.

The solid ingredients in the conductive composition described above are thoroughly blended in a suitable apparatus and the liquid ingredients added thereto. The mixture is then extruded in a Buss Condux Kneading Extruder, or other suitable apparatus, to melt the ingredients under shear. The composition is passed through a die, pelletized and stored.

In accordance with this invention, the conductive molding composition which has been thermally processed, i.e. heated under high shear, is mixed with a suitable solvent to form a dispersion of the conductive carbon black in a solution of the remaining ingredients. The dispersion is filtered and coated onto a plastic core disc. The coating is dried to form a thin conductive surface layer and compression molded to emboss the desired information into the surface layer.

Those of ordinary skill in the art will appreciate that a resin or additive ingredient is suitable for the method of this invention only if it is soluble in the solvent or solvents selected to form the subject dispersions. The solvent must have a relatively low boiling point so that it can be conveniently and substantially removed from the layer of dispersion once it has been applied to the core disc or a support film. Ideally, the solvent must not have an adverse effect on any of the ingredients of the formulation or on the performance properties of the finished CED. From the standpoint of expense and solvent handling, it is preferred that the solvent dissolve the resin and additives to a high concentration so that minimal quantities are used. A preferred solvent is tetrahydrofuran. Other suitable solvents include methylethylketone, dimethyl formamide, cyclohexanone, methylene chloride and the like.

The amount of the thermally processed conductive composition added to the solvent is between about 10 and 25 percent by weight, preferably about 20 percent by weight. The amount of the ingredients other than the conductive carbon black in the solution is dependent on their solubility in the solvent and other considerations such as whether the viscosity of the resulting dispersion is suitable to the contemplated mode of application. The high shear of the extruder, as disclosed by Martin et al., uniformly disperses the carbon particles in the composition and breaks up agglomerates of carbon black.

The thermally processed conductive molding composition, therefore, produces a very fine dispersion of the carbon black in a solution of the other ingredients. While comminution of the other ingredients is not required because they are in solution, the conductive carbon black, which has a particle size range from about 100 to 500 angstroms, should be comminuted to break up the agglomerates of particles. The conductive carbon black is preferably comminuted to reduce the agglomerates to as fine a particle size range as possible. A principal advantage of the subject method is the fact that insoluble particulate impurities and carbon black agglomerates larger than a predetermined particle size can be removed from the carbon black-containing dispersion by filtration. Filtration of the subject dispersions removes particles larger than 25 micrometers and, preferably, larger than 10 micrometers. Particles larger than 10 micrometers can be removed with stainless steel filters. Since it is known that, in the case of CEDs, the physical size of impurities can have more of an adverse effect on the performance of the finished disc than their chemical makeup, the substantial importance of being able to filter the subject dispersions is readily appreciated. It is necessary to utilize a high speed mill or similar apparatus to disperse the thermally processed conductive molding composition in the solution and to wet and thoroughly disperse the carbon black and break up any remaining agglomerates prior to filtration. In the case of CEDs, the concept of impurity removal from the conductive molding composition is neither disclosed nor suggested in the literature.

The dispersion produced as described above is coated onto a plastic core disc. Various methods of coating the disc with the dispersion which may be utilized include spraying, dipping, painting and curtain-coating. A preferred method of depositing the dispersion is spin-coating. Experience has shown that exceptionally smooth, uniform coatings can be obtained in this way. The coating is dried, preferably air-dried, to form a uniform conductive layer, generally, from about 5 to 40 micrometers thick.

The core disc for the subject sandwich-type CEDs is suitably comprised of a rigid, vinyl chloride homopolymer-based formulation. Such compositions typically contain, in addition to the polymer, lubricants, plasticizers, stabilizers and the like. While it is preferred that the core disc be nonconductive, it can contain conductive carbon black particles and, therefore, have conductivity. Because the conductive layer of the subject discs is very thin, it is important that the core disc have a smooth surface. The core, coated on both surfaces with the conductive molding composition, is inserted into a compression mold containing the appropriate stampers and the information track embossed into the conductive layers.

The following Example further illustrates this invention, it being understood that the invention is in no way intended to be limited to the details described therein. In the Example, all parts and percentages are on a weight basis and all temperatures are in degrees Celsius, unless otherwise stated.

EXAMPLE

Fifteen parts by weight of conductive carbon black, CSX-200A of the Cabot Corporation, comminuted to reduce the particle size of the agglomerates to under 25 micrometers, were combined with: 77.5 parts of Geon 110×346, poly(vinyl chloride) resin of the B. F. Goodrich Co.; 0.25 part of Loxiol G-30 lubricant; 0.50 part of Loxiol G-70 lubricant; 1.0 part of calcium stearate lubricant; 0.75 part of Acryloid K-175, a commercially available processing aid of Rohm & Haas Company; and 2.0 parts of T-35 stabilizer of M & T Chemical Company and mixed until thoroughly blended. The following liquid ingredients were added to the solids with mixing: 1.0 part of dibutyltin maleate stabilizer, Mark 275 of Argus Chemical Company; and 2.0 parts of diundecyl phthalate (DUP) plasticizer. Mixing was continued until the temperature of the mixture reached 235° F. (113°). The mixture was cooled to ambient, fed to a Buss Condux Kneading Extruder and melt-extruded in the form of a pelletized molding composition.

The pelletized conductive molding composition was mixed with agitation with pure dry tetrahydrofuran to concentrations of 5, 10, 15 and 20 percent, respectively. The composition dissolved in the solvent with the exception of the carbon black which was finely dispersed therein. The dispersions were filtered through a Millipore filter to remove particles larger than 10 micrometers.

The dispersions were spin-coated onto 60 mil thick nonconductive discs of a rigid vinyl chloride homopolymer-based formulation. The discs were revolved at 400–450 rpm. The thickness of the coatings was 5 to 40 micrometers, depending on the concentration of the conductive molding composition in the dispersion. The discs were coated on one side, the coatings were air-dried to produce conductive layers, and the process repeated on the remaining side. The coated discs were placed in a conventional compression molding apparatus and an information track embossed therein. The resulting CEDs produced a commercially acceptable picture on playback utilizing a commercial playback apparatus.

I claim:

1. A method of forming a conductive, high density information disc suitable for capacitive readout which comprises:
   (a) blending a composition comprising from about 70 to about 85 percent by weight of a thermoplastic resin, from about 12 to about 20 percent by weight of finely divided particulate conductive carbon black, and stabilizers, processing aids and lubricants compatible therewith;
   (b) thermally processing said composition by heating under high shear to form a melt having the carbon particles uniformly dispersed therein;
   (c) mixing the thermally processed composition with a suitable organic solvent to form a dispersion of the conductive carbon black in a solution of the remaining ingredients;
   (d) filtering said dispersion to remove particles larger than 25 micrometers;
   (e) coating the dispersion onto a core disc;
   (f) drying the coating to form a conductive layer from about 5 to about 40 micrometers in thickness; and
   (g) embossing the conductive layer with an information track.

2. A method according to claim 1, wherein the thermoplastic resin is a homopolymer or copolymer of vinyl chloride.

3. A method according to claim 1, wherein the solvent is tetrahydrofuran.

4. A method according to claim 1, wherein the solvent is methylethylketone.

5. A method according to claim 1, wherein the conductive composition is thermally processed by passing through an extruder.

6. A method according to claim 1, wherein the dispersion is coated onto the core disc by spin-coating.

7. A method according to claim 1, wherein the dispersion is coated onto the core disc by spraying.

8. A method according to claim 1, wherein a conductive layer is formed on both sides of the core disc.

9. A method according to claim 1, wherein the core disc is nonconductive.

10. A method according to claim 1, wherein said filtering step removes particles larger than 10 micrometers.

* * * * *